(No Model.)
O. PEDERSON.
FURNITURE CASTER.
No. 368,110. Patented Aug. 9, 1887.
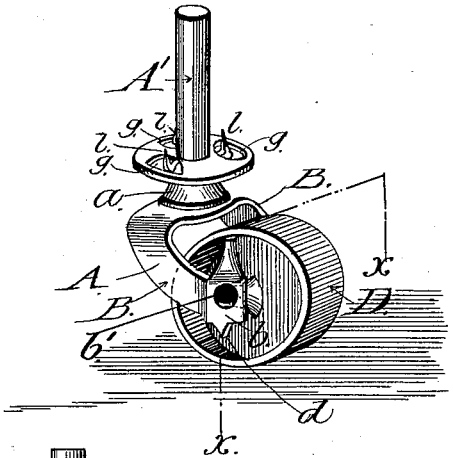
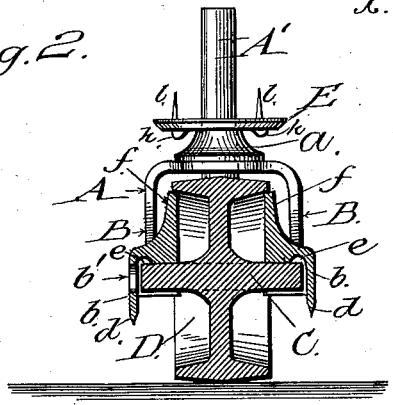
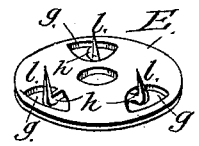
Witnesses
W. H. Patterson
T. W. Fowler
Inventor
Ole Pederson
By his Attorneys
A. H. Evans & Co.

UNITED STATES PATENT OFFICE.

OLE PEDERSON, OF JOLIET, ILLINOIS.

FURNITURE-CASTER.

SPECIFICATION forming part of Letters Patent No. 368,110, dated August 9, 1887.

Application filed May 13, 1887. Serial No. 238,133. (No model.)

*To all whom it may concern:*

Be it known that I, OLE PEDERSON, a citizen of the United States, residing at Joliet, in the county of Will and State of Illinois, have invented certain new and useful Improvements in Furniture-Casters, of which the following is a full, clear, and exact description, reference being had to the accompanying drawings, forming a part of this specification, in which—

Figure 1 represents a perspective view of a furniture-caster embodying my invention. Fig. 2 is a sectional view through the line X X of Fig. 1. Fig. 3 is a detail of the washer removed.

My invention relates to certain improvements in furniture-casters; and it consists in the peculiar construction and combination of devices, which I shall hereinafter fully describe and claim.

To enable others skilled in the art to which my invention appertains to make and use the same, I will now describe its construction and indicate the manner in which the same is carried out.

In the said drawings, A represents a shank having a sleeve, $a$, through which a pintle, A′, or equivalent device, is passed to secure said shank to the article of furniture. The shank is provided with arms B, having semicircular or other boxes $b$ formed in their outer ends for the reception of the ends of the axle C, projecting from the roller D. The boxes $b$ are open at their bottoms and inner sides, and have closed outer sides and top portions, the said outer sides terminating in the lips $d$, which assist in guiding the axle into the said boxes. If desired, one of the boxes $b$ may be cast with an opening, $b'$, through which the axle may be passed, thereby obviating the necessity of drilling an opening for said axle. In the upper portions of these boxes is formed a groove or depression, $e$, the object of which is to remove the heaviest pressure from the ends of the axle by preventing the same from coming in actual contact with the bearing-surface of the boxes. By this means the ends of the axle are prevented from binding in their bearings, and a more free rotation of the same obtained. Suitable lugs, $f$, extend upwardly from the outer ends of the arms B, and project to within a short distance of the flange of the roller, as shown in Fig. 2, said lugs serving, by engaging said flange, to prevent the axle from dropping out of its bearings when the roller is lifted from the floor. Upon the pintle which passes through the sleeve $a$ is a washer of peculiar form, which is designed to be driven into the wood of the furniture to retain the caster thereto. This washer E is formed with three or more openings, $g$, from the inner central sides of which project headed extensions $h$, having upwardly-extending pins or prongs $l$, which enter the wood, and, in connection with the pintle A′, secure the caster thereto.

In operating my caster the roller is slipped between the outer ends of the arms B, the latter yielding to permit the flange of said roller to pass the lugs $f$. As soon as this latter object is accomplished, the arms B and the lugs $f$ spring inward, so that the latter will rest slightly within and just beneath the flange of said roller, whereby said roller is held from disengagement.

The washer is secured to the wood of the furniture by driving separately each of its pins or prongs $l$ into the same, a "nail-set" or punch being used against the headed portions of the extensions to effect a more secure fastening. By this means the said washer may be fitted in a true horizontal position to the leg, even though the end of said leg may be irregular or not properly squared.

Having thus described my invention, what I claim as new, and desire to secure by Letters Patent, is—

1. An improved furniture-caster, comprising a roller, an axle extending therefrom, a shank having boxes with open inner sides and bottom and closed outer sides, one of said boxes having an opening, $b'$, formed in its outer side, and the spring-lugs $f$, substantially as herein described.

2. The combination, with a shank, a roller mounted therein, and the pintle A′, of a washer on said pintle having a plural number of openings with centrally-disposed headed pins therein, said pins adapted to be separately driven into the wood of the furniture, substantially as specified.

OLE PEDERSON.

Witnesses:
H. D. STEARNS,
T. W. FOWLER.